(12) United States Patent
Coscarella

(10) Patent No.: US 12,291,862 B2
(45) Date of Patent: May 6, 2025

(54) SUPPORT FOR SEALING AROUND A BUILDING PENETRATION

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 216 days.

(21) Appl. No.: 17/379,978

(22) Filed: Jul. 19, 2021

(65) Prior Publication Data

US 2022/0018466 A1  Jan. 20, 2022

Related U.S. Application Data

(60) Provisional application No. 63/053,485, filed on Jul. 17, 2020.

(51) Int. Cl.
| | |
|---|---|
| *E04B 1/66* | (2006.01) |
| *F16L 5/00* | (2006.01) |
| *F16L 5/10* | (2006.01) |
| *H02G 3/22* | (2006.01) |

(52) U.S. Cl.
CPC ............... *E04B 1/665* (2013.01); *E04B 1/66* (2013.01); *F16L 5/00* (2013.01); *F16L 5/10* (2013.01); *H02G 3/22* (2013.01)

(58) Field of Classification Search
CPC . E04B 1/665; E04B 1/66; E04B 1/625; E04B 1/64; F16L 5/00; F16L 5/10; H02G 3/22; E04F 21/1657
USPC ........................................................ 52/741.4
See application file for complete search history.

(56) References Cited

U.S. PATENT DOCUMENTS

| | | | |
|---|---|---|---|
| 1,249,892 A | | 12/1917 | Bropson |
| 2,407,023 A | | 9/1946 | Lockwood |
| 2,670,976 A | | 3/1954 | Owen |
| 3,591,190 A | | 7/1971 | Winay et al. |
| 3,787,061 A | | 1/1974 | Yoakum |
| 3,788,655 A | * | 1/1974 | Hathaway ................. F16L 5/10 16/2.2 |
| 3,809,350 A | | 5/1974 | Lane |
| 3,881,752 A | | 5/1975 | Fujishima |
| 3,913,928 A | | 10/1975 | Yamaguchi |
| 4,087,624 A | | 5/1978 | Hitchcock |
| 4,162,347 A | | 7/1979 | Montgomery |
| 4,265,058 A | | 5/1981 | Logsdon |
| 4,293,138 A | | 10/1981 | Swantee |
| 4,296,870 A | | 10/1981 | Balkwill |
| 4,350,351 A | | 9/1982 | Martin |

(Continued)

FOREIGN PATENT DOCUMENTS

| | | |
|---|---|---|
| CA | 2452668 A1 | 3/2005 |
| CA | 2841366 A1 | 8/2015 |

(Continued)

*Primary Examiner* — Beth A Stephan
(74) *Attorney, Agent, or Firm* — Nathan V. Woodruff

(57) ABSTRACT

A method of sealing around a penetration that extends out of a wall of a building with structural members separated by spaces. A weather barrier is installed across the structural members of the wall such that the weather barrier defines a wall surface and the penetration extends past the wall surface. A backer support is installed behind the weather barrier and adjacent to the penetration. The penetration is sealed to the weather barrier by applying a sealing material around the penetration, the backer support being sufficiently rigid to support the weather barrier and the sealing material against pressure applied during installation.

23 Claims, 16 Drawing Sheets

(56) References Cited

U.S. PATENT DOCUMENTS

| | | | |
|---|---|---|---|
| 4,385,777 A | 5/1983 | Logsdon | |
| D269,454 S | 6/1983 | Houseman | |
| 4,386,488 A | 6/1983 | Gibbs | |
| 4,482,161 A | 11/1984 | Izzi, Sr. | |
| 4,526,407 A | 7/1985 | Kifer | |
| 4,548,853 A | 10/1985 | Bryan | |
| 4,563,847 A | 1/1986 | Hasty | |
| 4,570,943 A | 2/1986 | Houseman et al. | |
| 4,794,207 A | 12/1988 | Norberg | |
| 4,903,997 A | 2/1990 | Kifer | |
| 4,905,940 A | 3/1990 | Luka | |
| 4,927,039 A | 5/1990 | McNab | |
| 4,952,754 A | 8/1990 | Rye | |
| 5,015,700 A | 4/1991 | Blair | |
| 5,133,165 A | 7/1992 | Wimberly | |
| 5,226,263 A | 7/1993 | Merrin et al. | |
| 5,237,789 A | 8/1993 | Thaler | |
| 5,248,154 A | 9/1993 | Westhoff | |
| 5,287,665 A | 2/1994 | Rath, Jr. | |
| 5,347,776 A | 9/1994 | Skoff | |
| 5,501,472 A | 3/1996 | Brancher | |
| 5,549,266 A | 4/1996 | Mitchell et al. | |
| 5,560,618 A | 10/1996 | Wambeke et al. | |
| 5,588,267 A | 12/1996 | Rodriguez et al. | |
| 5,667,224 A | 9/1997 | Streckert et al. | |
| 5,807,335 A | 9/1998 | Kriesel et al. | |
| 5,829,214 A | 11/1998 | Hart | |
| 5,860,256 A | 1/1999 | Humber | |
| 5,944,361 A | 8/1999 | Bravo | |
| 5,977,486 A | 11/1999 | Fujita | |
| 6,070,928 A | 6/2000 | Campbell | |
| 6,079,751 A | 6/2000 | Youngs | |
| 6,161,589 A | 12/2000 | Bolotte et al. | |
| 6,185,885 B1 | 2/2001 | Thaler | |
| 6,239,365 B1 | 5/2001 | McEvers | |
| 6,315,849 B1 | 11/2001 | Ross | |
| 6,395,984 B1 * | 5/2002 | Gilleran | H02G 3/123 174/53 |
| 6,417,447 B1 | 7/2002 | Bosse, Jr. | |
| 6,494,463 B1 | 12/2002 | Rank | |
| 6,543,186 B2 * | 4/2003 | Gilleran | E03C 1/02 52/220.8 |
| 6,588,801 B1 | 7/2003 | Mayle | |
| 6,596,938 B2 * | 7/2003 | Gilleran | H02G 3/123 174/53 |
| 6,649,835 B2 * | 11/2003 | Gilleran | H02G 3/088 174/53 |
| 6,723,921 B2 | 4/2004 | Vagedes | |
| 6,807,780 B2 * | 10/2004 | McCahill | E04C 3/02 52/220.8 |
| 6,860,070 B2 | 3/2005 | Gilleran | |
| 6,862,852 B1 | 3/2005 | Beele | |
| 6,891,104 B2 | 5/2005 | Dinh | |
| 6,951,081 B2 | 10/2005 | Bonshor | |
| 6,979,777 B2 | 12/2005 | Marcou et al. | |
| 7,005,578 B2 | 2/2006 | Gretz | |
| 7,176,377 B1 | 2/2007 | Gretz | |
| 7,192,219 B2 | 3/2007 | Graziosi | |
| 7,305,801 B2 | 11/2007 | Gilleran | |
| 7,319,192 B1 | 1/2008 | Gretz | |
| 7,410,372 B2 | 8/2008 | Johnson et al. | |
| 7,435,900 B1 | 10/2008 | Gretz | |
| 7,568,314 B2 * | 8/2009 | Collins | F16L 5/02 52/220.8 |
| 7,626,118 B1 | 12/2009 | Capozzi | |
| 7,637,385 B2 | 12/2009 | Wegner | |
| 7,645,937 B2 | 1/2010 | Bhosale | |
| 7,674,974 B1 | 3/2010 | Shotey | |
| 7,682,675 B2 | 4/2010 | Boge et al. | |
| 7,763,799 B2 | 7/2010 | Johnson | |
| 7,789,257 B2 | 9/2010 | Davis | |
| 7,802,798 B2 | 9/2010 | Beele | |
| 7,875,798 B2 | 1/2011 | Funk et al. | |
| 7,880,085 B2 | 2/2011 | Nurenburg et al. | |
| 7,918,066 B1 | 4/2011 | Bauer | |
| 8,046,955 B2 | 11/2011 | Chan et al. | |
| 8,079,599 B2 | 12/2011 | Meyers | |
| 8,156,700 B2 | 4/2012 | Umlor | |
| 8,307,590 B2 | 11/2012 | Smith | |
| 8,490,353 B2 | 7/2013 | Beele | |
| 8,530,757 B2 | 9/2013 | Dinh | |
| 8,833,014 B2 | 9/2014 | Beele | |
| 8,933,331 B1 | 1/2015 | Gretz | |
| 9,228,689 B1 | 1/2016 | Cline et al. | |
| 9,337,647 B2 | 5/2016 | Gilleran | |
| 9,523,200 B2 | 12/2016 | Lechuga et al. | |
| 9,647,439 B1 | 5/2017 | Gretz et al. | |
| 9,651,174 B2 | 5/2017 | Lechuga et al. | |
| 9,883,602 B2 | 1/2018 | Coscarella | |
| 10,132,084 B2 * | 11/2018 | Gilleran | E04D 13/1476 |
| 10,490,988 B1 | 11/2019 | Baldwin et al. | |
| 10,787,804 B2 * | 9/2020 | Coscarella | F16L 5/10 |
| 11,480,268 B2 * | 10/2022 | Coscarella | F16L 5/10 |
| 2001/0052564 A1 | 12/2001 | Karlinger | |
| 2002/0179317 A1 | 12/2002 | Hurley | |
| 2003/0019163 A1 | 1/2003 | Dittel | |
| 2003/0037942 A1 | 2/2003 | Haselby et al. | |
| 2003/0052074 A1 | 3/2003 | Chang et al. | |
| 2003/0178787 A1 | 9/2003 | Christie et al. | |
| 2004/0045233 A1 | 3/2004 | Beele | |
| 2005/0017610 A1 | 1/2005 | Mistry et al. | |
| 2005/0028456 A1 | 2/2005 | McLane et al. | |
| 2005/0042403 A1 | 2/2005 | Boge et al. | |
| 2005/0055889 A1 | 3/2005 | Thaler | |
| 2006/0027388 A1 | 2/2006 | Collins | |
| 2006/0130411 A1 | 6/2006 | Edgar et al. | |
| 2007/0245894 A1 | 10/2007 | Poulis | |
| 2008/0085336 A1 | 4/2008 | Mayle | |
| 2008/0124506 A1 | 5/2008 | Boge et al. | |
| 2008/0157518 A1 | 7/2008 | Cecilio | |
| 2009/0152820 A1 | 6/2009 | Meyers | |
| 2010/0059941 A1 | 3/2010 | Beele | |
| 2010/0263311 A1 | 10/2010 | Ryden | |
| 2011/0024993 A1 | 2/2011 | Happel et al. | |
| 2011/0056743 A1 | 3/2011 | Solan | |
| 2011/0266277 A1 | 11/2011 | Garvin | |
| 2012/0090263 A1 | 4/2012 | Schaefer | |
| 2012/0279777 A1 | 11/2012 | Gagne et al. | |
| 2013/0231042 A1 | 9/2013 | Coscarella | |
| 2013/0234404 A1 * | 9/2013 | Coscarella | F16L 5/02 277/606 |
| 2013/0264088 A1 | 10/2013 | Dinh | |
| 2014/0021688 A1 | 1/2014 | Hattori et al. | |
| 2014/0023804 A1 | 1/2014 | Cascarella | |
| 2014/0159359 A1 | 6/2014 | Beall | |
| 2014/0196271 A1 | 7/2014 | Coscarella | |
| 2014/0202758 A1 | 7/2014 | Lolachi | |
| 2014/0232106 A1 | 8/2014 | Mukai et al. | |
| 2014/0260044 A1 * | 9/2014 | Gilleran | F16L 5/10 52/506.1 |
| 2015/0075080 A1 | 3/2015 | Ellingson | |
| 2015/0076978 A1 | 3/2015 | Ellingson | |
| 2015/0085500 A1 | 3/2015 | Cooper et al. | |
| 2015/0218798 A1 | 8/2015 | Coscarella | |
| 2015/0218799 A1 | 8/2015 | Coscarella | |
| 2015/0218828 A1 | 8/2015 | Goddard | |
| 2015/0323103 A1 * | 11/2015 | Coscarella | F16L 5/10 277/606 |
| 2016/0076673 A1 | 3/2016 | Rule et al. | |
| 2016/0201325 A1 | 7/2016 | Moore | |
| 2016/0258165 A1 | 9/2016 | Walters | |
| 2017/0104322 A1 | 4/2017 | Scheuer et al. | |
| 2017/0241572 A1 | 8/2017 | Muenzenberger | |
| 2017/0305366 A1 | 10/2017 | Ujita | |
| 2018/0209564 A1 * | 7/2018 | Gilleran | E04D 13/1476 |
| 2018/0228259 A1 | 8/2018 | Lipner et al. | |
| 2018/0265018 A1 | 9/2018 | Yabashi | |
| 2018/0297542 A1 | 10/2018 | Schwimmbeck et al. | |
| 2019/0242125 A1 * | 8/2019 | Lambach | E04C 2/205 |

(56) References Cited

U.S. PATENT DOCUMENTS

| | | | |
|---|---|---|---|
| 2020/0052473 A1* | 2/2020 | Gilstrap | ................ H01R 13/73 |
| 2021/0203144 A1 | 7/2021 | Akiba | |

FOREIGN PATENT DOCUMENTS

| | | |
|---|---|---|
| CA | 2896296 A1 | 1/2017 |
| DE | 4131637 A1 | 4/1992 |
| DE | 29800679 U1 | 7/1998 |
| DE | 202012101447 U1 | 9/2012 |
| DE | 202013100908 U1 | 8/2013 |
| EP | 0161557 A2 | 11/1985 |
| EP | 2703703 A1 | 3/2014 |
| EP | 2063163 B1 | 8/2014 |
| FR | 2567240 A1 | 1/1986 |
| GB | 2216220 B | 11/1992 |
| JP | 2007040610 A | 2/2007 |

\* cited by examiner

SUPPORT FOR SEALING AROUND A BUILDING PENETRATION

TECHNICAL FIELD

This relates to a support for sealing around a utility, and in particular, a support used during installation of building wrap material around a utility.

BACKGROUND

In building constructions, a weatherproof or vapor barrier may be installed the walls of the buildings, which may include interior walls, exterior walls, ceilings, or roofs. Building wrap, sometimes referred to as WRB (water-resistive barrier), is typically a flexible, foldable material similar to paper. Examples of WRB may include Tyvek™, tar paper, felt paper, etc. The vapor barrier may be polyethylene sheeting, that may be installed on the inside of an external wall, the bottom of a ceiling, or other interior surface. The barrier may be installed around penetrations, such as windows, doors, pipes, conduits, utilities, etc. that pass through the walls of the building. Utilities may include electrical conduits, plumbing conduits, vents, gas lines, water lines, electrical outlets, recessed lighting, in-wall or in-ceiling speakers, etc.

In some constructions, rigid sheeting material, such as plywood, etc., may be installed on the wall surface that underlies the building wrap and the finished surface of the wall, such as siding material. For example, with an exterior wall, plywood may be installed on the structural members of the wall to allow vinyl siding or other siding material to be installed. In other constructions, referred to as open stud construction, the building wrap may be installed directly onto the structural members and behind the siding material.

SUMMARY

According to an aspect, there is provided a method of sealing around a penetration that extends out of a wall of a building, the wall comprising structural members separated by spaces and the penetration being positioned in one of the spaces, the method comprising the steps of: installing a weather barrier across the spaces between the structural members of the wall such that the weather barrier defines a wall surface and such that the penetration extends past the wall surface, the weather barrier comprising a flexible sheet of material; installing a backer support behind the weather barrier and adjacent to the penetration, the backer support extending at least partially across one or more and may be substantially smaller than an average one of the spaces; and sealing the penetration to the weather barrier by applying a sealing material around the penetration, the backer support being sufficiently rigid to support the weather barrier and the sealing material against pressure applied during installation.

According to other aspects, the method may comprise one or more of the following aspects, alone or in combination: the weather barrier may be attached directly to the structural members and closes the spaces when installed; the sealing material may comprise a sheet of flashing material surrounding the penetration, the sheet of flashing material being installed such that an upper portion is between the backer support and the weather barrier, and a lower portion overlies the weather barrier and the backer; the sealing material may comprise caulking, acoustical sealant, adhesive tape, a sheet of flashing material, a sheet of flashing material, or combinations thereof; the backer support may comprise folding flaps that fold away from the wall surface to increase the rigidity of the backer; the backer support may be attached to a single support member; the backer support may be attached between adjacent support members to increase the rigidity of the backer; the backer support may mounted to the penetration; the backer support may surround the penetration; and the structural members may be studs, trusses, beams, joists, or a utility support member.

According to an aspect, there is provided a building wall having structural members separated by spaces and a penetration positioned in one of the spaces that extends out of the building wall, the building wall comprising a weather barrier installed across the spaces between the structural members such that the weather barrier defines a wall surface and such that the penetration extends comprising a flexible sheet of material; a backer support installed behind the weather barrier and adjacent to the penetration; and a sealing material that seals between the penetration and the weather barrier, the backer support having sufficient rigidity to support pressure applied to the sealing material and the flexible sheet of material during installation of the sealing material.

According to other aspects, the building wall may comprise on or more of the following features, alone or in combination: the weather barrier may be attached directly to the structural members and closes the spaces when installed; the sealing material may comprise a sheet of flashing material surrounding the utility, the sheet of flashing material comprising an upper portion positioned between the backer support and the weather barrier, and a lower portion overlying the weather barrier and the backer; the sealing material may comprise caulking, acoustical sealant, adhesive tape, a sheet of flashing material, or combinations thereof; the backer support may comprise folding flaps that fold away from the wall surface to increase the rigidity of the backer support; the backer support may surround the penetration; the backer may be attached to a single support member; the backer may be attached between adjacent support members to increase the rigidity of the backer support; the backer may be mounted to the penetration; the structural members may be studs, trusses, beams, joists, or a utility support member.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A building wall with a penetration and a method of sealing around a penetration will now be described with reference to FIG. 1 through 29.

Homes are often constructed with sheeting along the walls of the building, however in some circumstances, the structural members that define the wall, such as studs, trusses, beams, joists, etc. may be an open frame design, may have sheeting only on one side of the wall, or may have sheeting installed later in the construction process. The structural members may also include cross braces, or other intermediate pieces where the main function is to support a penetration rather than as a structural component of the wall. For example, a penetration that is positioned part way between two structural members may require an additional component to be installed to provide adequate support to the penetration. The structural member may also include the penetration or a portion of the penetration itself, such as the outer surface of a pipe, or the electrical box in which an electrical outlet, switch, etc. is installed.

Figure 1:
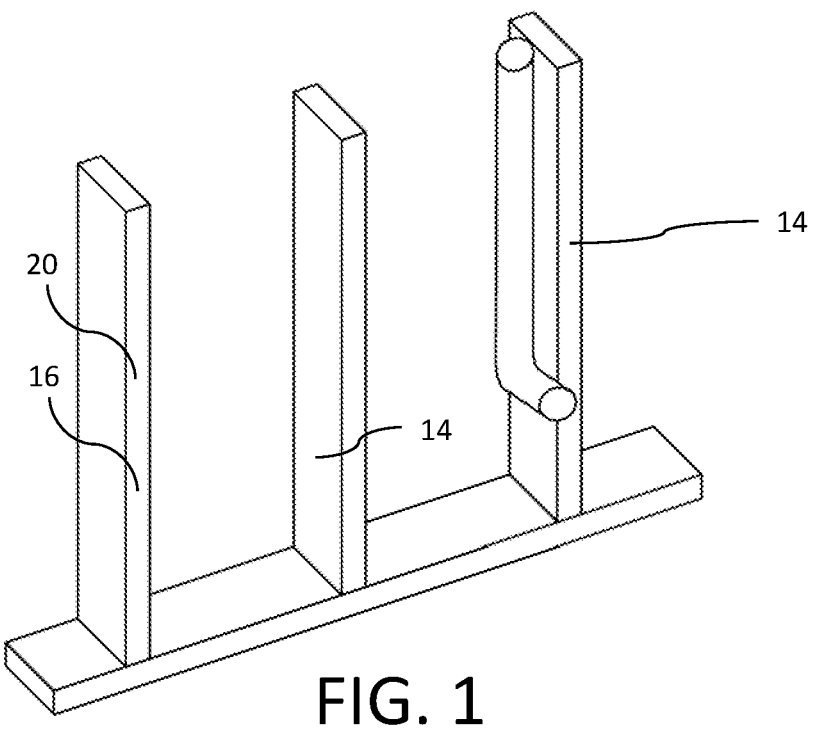
FIG. 1 is a perspective view of a wall of a building.
Figure 2:
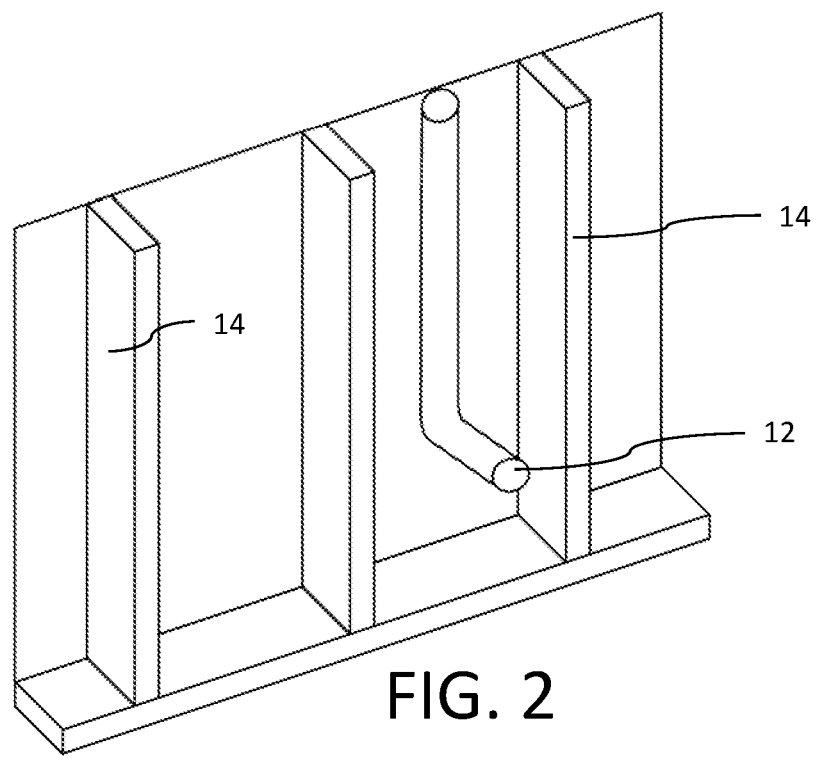
FIG. 2 is a perspective view of a wall of a building with building wrap opposite the building penetration.

In some new constructions, an open frame design may be used, an example of which is shown in FIG. 1. As shown, a wall 16 is made from support members 14, which may be referred to as studs for a vertical wall, or may be studs, trusses, beams, joists, cross braces, etc. for a ceiling, a basement wall, etc. Support members 14 define a wall face from which a penetration 12, such as a utility line, extends. Penetration 12 may be immediately adjacent and attached to support members 14 as shown in FIG. 1, or spaced from support members 14 and may or may not be attached to support members 14 or to cross-pieces between support members 14 as shown in FIG. 2.

In the examples below, the building wall will be discussed generally in terms of a vertical wall made from studs, however the discussion will apply generally to interior surfaces, exterior surfaces, ceilings, etc. unless otherwise specified, or apparent from the context. In the context of an exterior wall, referring to FIG. 3, building wrap 18 may be installed on an exterior surface 20 of the wall 16, and having utilities 12, such as vents, fluid line, etc. extending out through the building wrap material. While gaps are shown around building wrap 18, this is for illustration purposes only to show the relative position of studs 14. It will be understood that, in a new construction, building wrap 18 will entirely or substantially cover the exterior surface of wall 16.

Figure 4:
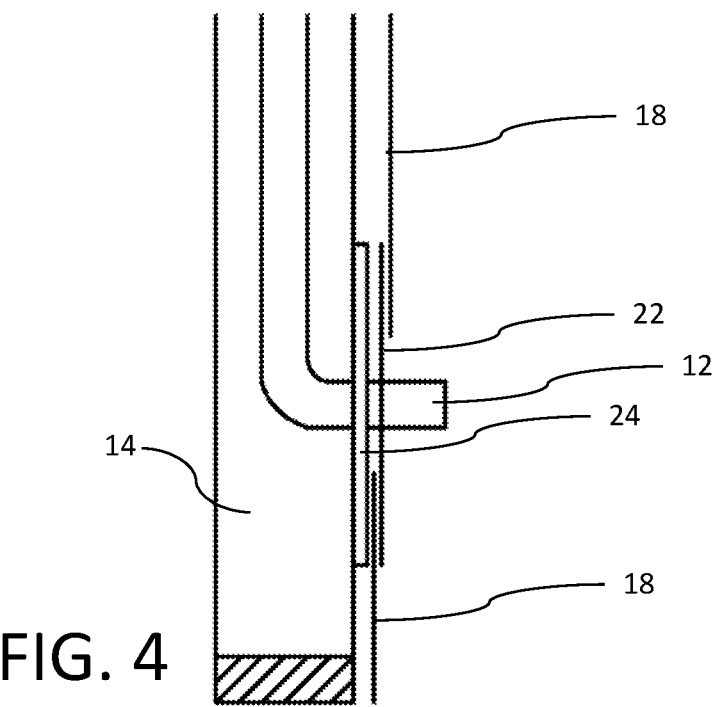
FIG. 4 is a side elevation view of a sealing sheet shingled with building wrap and a backer plate.

On exterior surface 20 of wall 16, it is necessary to seal around utility 12 and install building wrap 18 around penetration 12 such that water is directed away from the interior of the building. This may be accomplished using tape 26, a sheet of material 22 with an aperture that receives penetration 12, or both tape 26 and sheet of material 22. Sheet of material 22 may be flashing material. One example of a suitable sheet of material is described in Canadian patent application no. 2,789,045 (Coscarella) entitled "Seal for a Protrusion on an Exterior Wall". Sheet of material 22 may be made from various suitable materials, which may include breathable and non-breathable material, flexible material, rigid material, or semi-rigid material. In one example, sheet 22 may be made from polyethylene. In general, sheet of material 22, tape 26, etc. seal against at least water, and may be referred to as sealing material herein, along with other types of sealing material. If both sheet 22 and tape 26 are used, flashing 22 may be installed on penetration 12 to provide a barrier that sheds water away from penetration 12, and building wrap 18 may be installed over and around penetration 12 in combination with flashing 22 to shed water away from the interior of the building. In this example, tape 26 may be applied between flashing 22 and building wrap 18 to provide a suitable seal against water, vapor, air, etc. as required. Referring to FIG. 4, a backer support 24 may be placed behind the building wrap 18 material and/or the sealing material, such as flexible sheet 22 and tape 26 in the depicted example, to provide a substrate that provides support for the necessary components to retain their required orientations and position during installation. For example, if tape is used, backer support 24 provides a surface against which pressure may be applied to adhere tape 26 to the wall around penetration 12. This may be useful, for example, if sheet 22 has insufficient internal support to remain upright during installation, or to allow pressure to be applied to ensure the components are adhered. While backer support 24 may be intended to be used during installation, it may also be useful after installation to provide additional support around a penetration. Backer support 24 may be described herein as a backer plate, however backer support 24 may take various forms that provide a suitably flat surface to support sealing material 22 and building wrap 18.

Backer support 24 is substantially smaller than the space defined by the structural member, and is sized primarily based on the size of the sealing material being installed. For example, the size of backer support 24 may be selected to be sufficiently large to underlie the sealing material, plus an additional margin, and sufficiently large to allow backer support 24 to be attached to the wall. In addition, while backer support 24 is sufficiently supportive to allow the sealing material to be installed, backer support 24 may be insufficiently supportive to provide structural support to the wall of the building.

Another type of barrier may include a vapor barrier such as may be installed on an interior surface, such as in a ceiling, a basement wall, etc. that are formed by studs, trusses, beams, joists, cross braces, etc. While the weather barrier installed on an external surface of a building may be used primarily as a barrier against water and may be breathable in some cases, a vapor barrier is typically intended to prevent airflow, in which case air passages through the barrier are preferably closed and sealed. In this example, the sheet of material may be a vapour barrier hat, such as may be used to surround a pot light, a switch, speaker, or other penetration that may be installed in a wall or ceiling, and that ties in with the vapour barrier in the wall. Alternatively, the weather barrier may involve the use of a fluid sealant, such as an acoustical sealant, caulking, etc.

Figure 3:
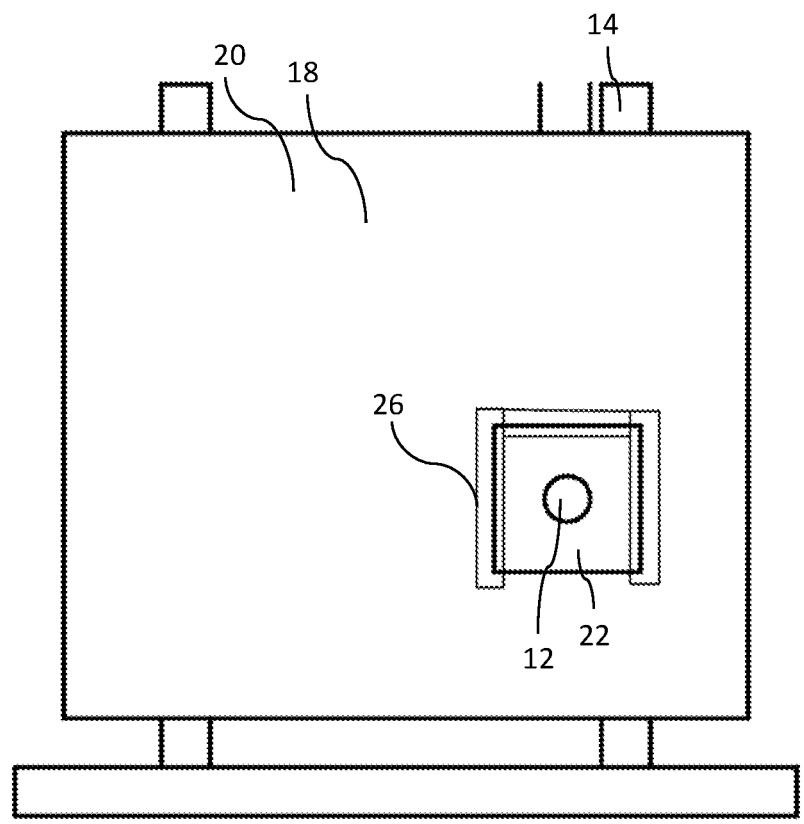
FIG. 3 is a front elevation view of a sealing sheet taped to building wrap.

Referring to FIG. 3 and FIG. 4, in one example, a backer plate 24 may be provided behind flexible building wrap 18 and flashing 22 to provide sufficient support for tape 26 to be applied around flashing 22 and against building wrap 18. Building wrap, or WRB 18, may be shingled with flashing 22, or otherwise arranged in a suitable manner to provide adequate protection to the building. If building wrap 18 and flashing 22 are suitably installed, tape 26 may not be required to achieve a suitable weather barrier on exterior surface 20, although tape may be used to improve installation to prevent inadvertent water egress or inadvertent movement due to wind, time, etc. If barrier 18 is an internal layer used as a vapor barrier, tape may be required to ensure an air barrier is formed. In this case, backer 24 may be used to hold flashing 22 upright relative to the WRB 18. Where appropriate, a similar design may also be used for other types of weather barriers, such as poly hats.

Backer plate 24 may be fixed in place by either attaching it to the stud 14, or by attaching it to the flexible sheet of material 22 such that it underlies the flexible sheet of material 22. As can be seen, flashing tape 26 is applied to the sides and to the top of the flexible sheet 22. This allows to be installed using a "shingling" design to prevent moisture from entering the structure, although it will be understood that tape may be applied to all sides as well.

Figure 5:
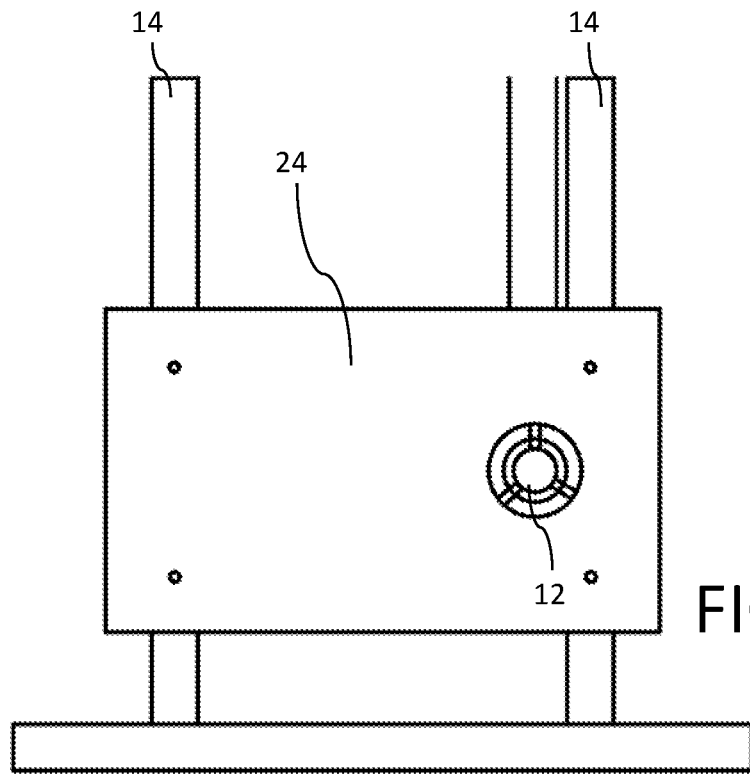
FIG. 5 is a front elevation view of a backer plate and a penetration attached to a stud.
Figure 6:
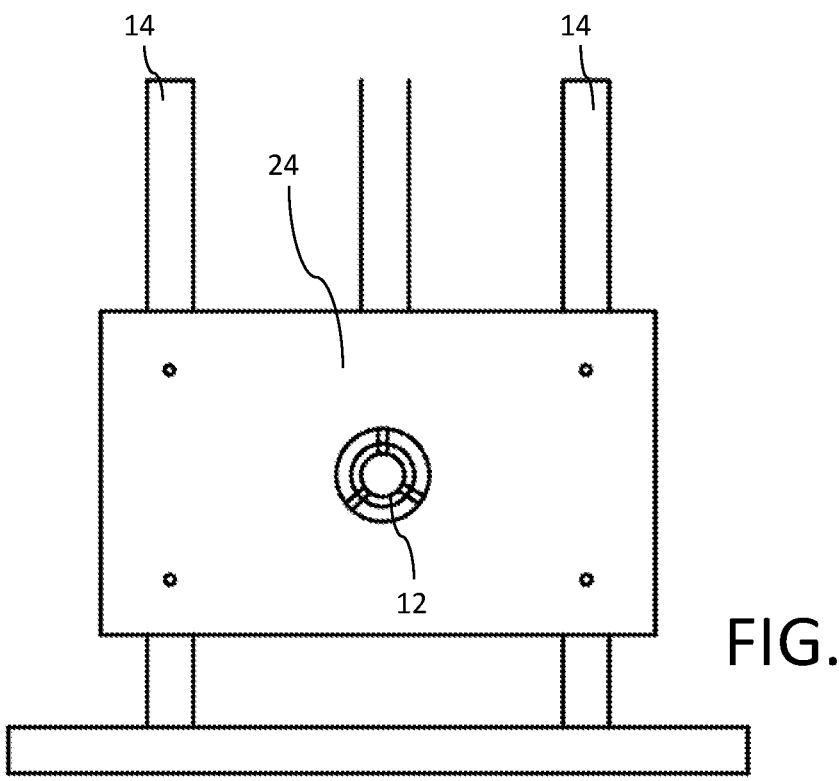
FIG. 6 is a front elevation view of a backer plate and a penetration spaced from a stud.
Figure 7:
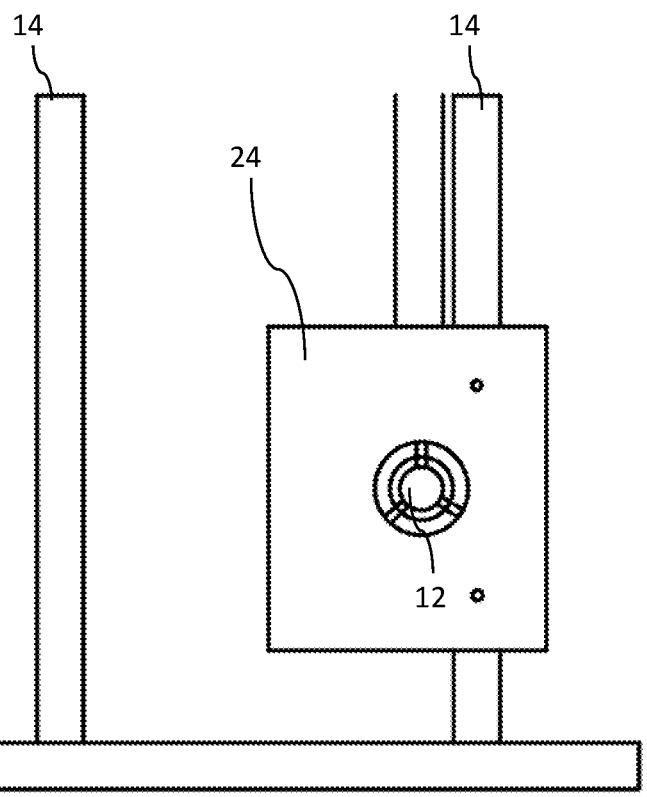
FIG. 7 is a front elevation view of a backer plate that is attached to one stud.
Figure 8:
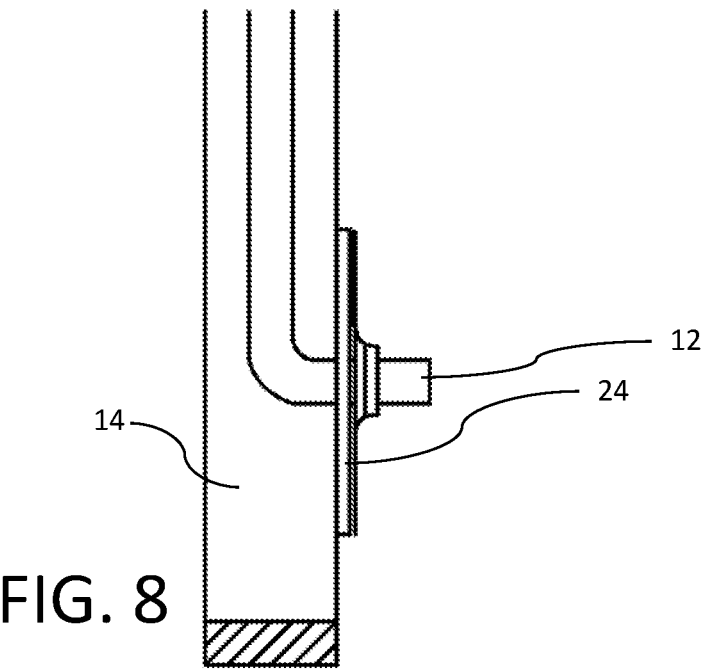
FIG. 8 is a side elevation view of a backer plate installed on a penetration.

Referring to FIG. 5 and FIG. 6, backer plate 24 may be installed between studs 14 to provide additional stability. Referring to FIG. 7 and FIG. 8, backer plate 24 may be installed to a single stud, where backer plate 24 is sufficiently rigid to support the flexible sheet of material and/or the building wrap material. In either case, the strength and rigidity of backer plate 24 may be designed to reflect the intended method of installation.

Backer plate 24 may be installed such that penetration 12 itself, or a portion thereof, provides some or all the structural support required by backer plate 24. In this case, baker plate 24 may have a collar or other rigid connection that allows it to be rigidly attached to penetration 12. This may not be a sealed connection if backer plate 24 is rigid, which may make a seal difficult to form. In one example, backer plate 24 may have a frangible opening 30 that opens to allow penetration 12 to be inserted therethrough such that it engages penetration 12. The frangible opening 30 may be resilient such that it applies a clamping force onto penetration 12, or may be plastically deformed sufficiently to fit over penetration 12, and then engages penetration 12.

Figure 9:
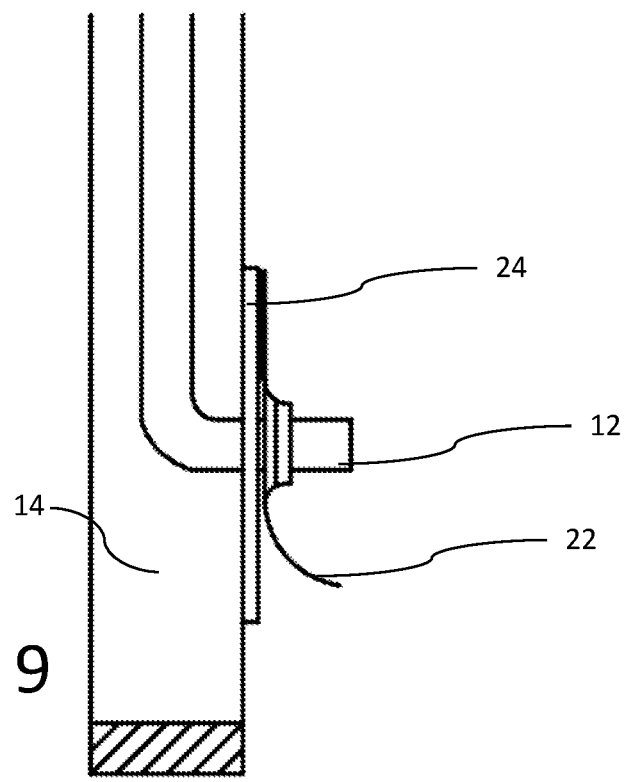
FIG. 9 is a side elevation view of a sheet of flashing installed on a backer plate.
Figure 15:
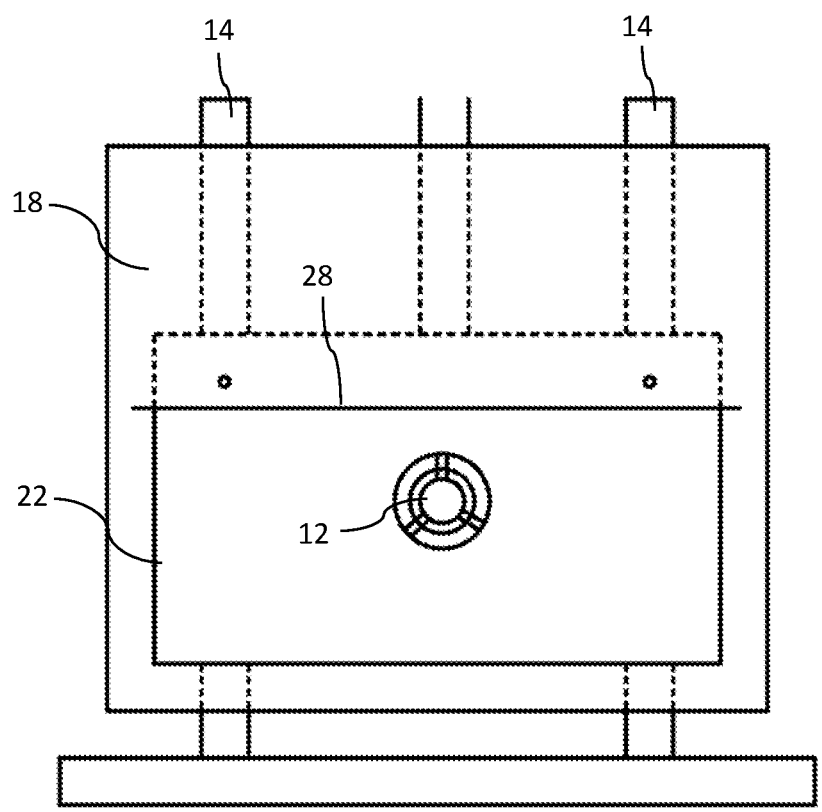
FIG. 15 is a front elevation view of a sheet of flashing material installed with building wrap around a penetration.
Figure 16:
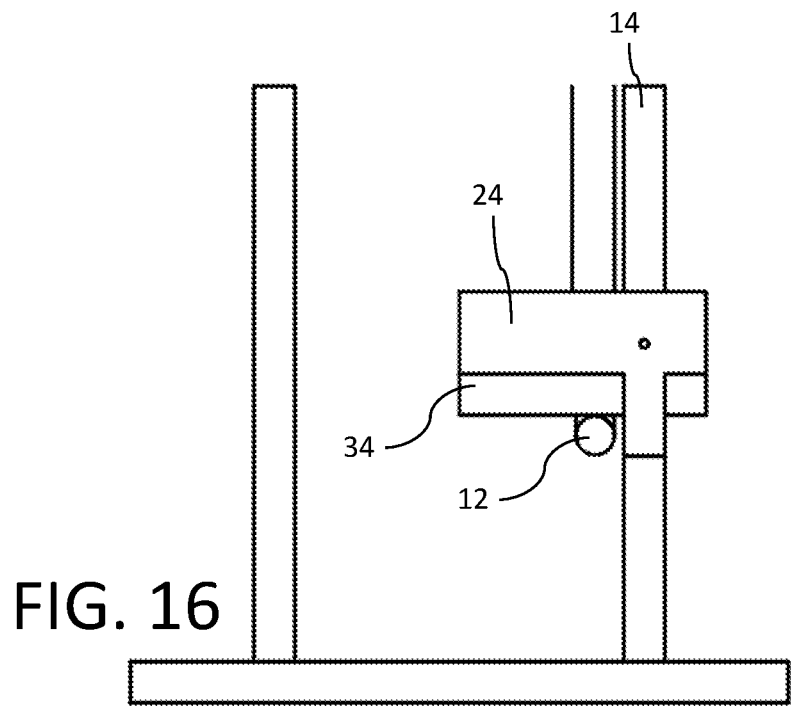
FIG. 16 is a front elevation view of a backer plate with folded flaps.
Figure 17:
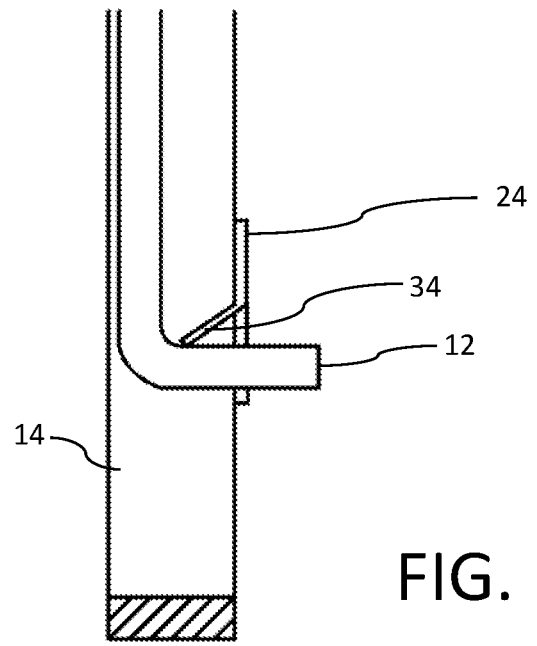
FIG. 17 is a side elevation view of a backer plate with folded flaps.

When installing backer plate 24, flexible sheet 22, and building wrap material 18, the components may be shingled to better shed water. For example, flexible sheet 22 may be placed on penetration 12 when penetration 12 is installed. When building wrap material 18 is installed, typically from the bottom up, the bottom part of flexible sheet 22, such as the portion below penetration 12, may be folded up to allow building wrap 18 to be installed, then flexible sheet 22 folded down over building wrap material 18. Another layer of building wrap 18 may then be installed above penetration 12, such that the top portion of flexible sheet 22 is behind the building wrap while the bottom portion overlies building wrap material 18. In this case, backer plate 24 may be attached along the top of backer plate 24 and flashing 22, such that the bottom of flashing 22 may be lifted relative to backer plate 24, as shown in FIG. 9. Backer plate 24 ensures flashing 22 does not fold back and is held upright as tape 26 is installed around flashing 22. In another example, a sheet of building wrap 18 may be cut and placed over the penetration, such that the penetration extends through a middle portion. Flashing 22 may be behind or in front of building wrap 18 and may be sealed using tape 26 using backer 24 as support. Alternatively, a slot 28 may be cut in the building wrap 18, as shown in FIG. 15, such that the top portion of flashing 22 is behind building wrap 18 and the bottom portion overlies building wrap 18, with the seal completed using tape 26 as shown in FIG. 3.

An example of an installation of this embodiment is described below, where a sufficiently rigid backer 24 is installed around penetration 12 and behind flashing 22, or behind tape 26 that may be attached directly between penetration 12 and building wrap 18.

Figure 10:
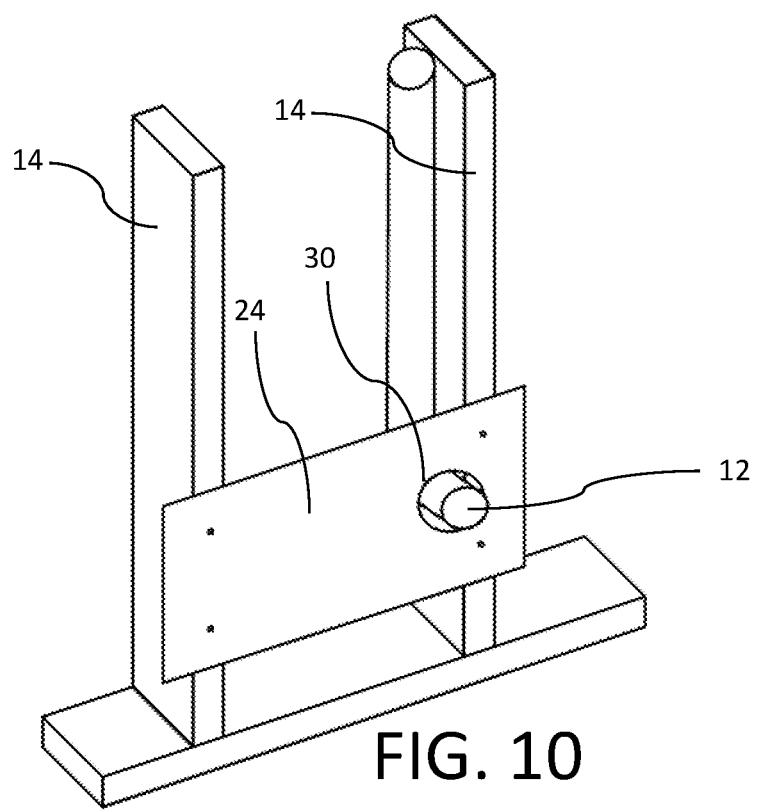
FIG. 10 is a perspective view of a backer plate that has an opening that receives a penetration.

Referring to FIG. 10, an example of a backer 24 may be installed between studs 14 and around penetration 12 is shown. Note that the size of an opening 30 through backer 24 may be significantly larger than the size of penetration 12, provided that backer 24 is sufficiently large to provide an adequate support to create the seal, such as by applying tape.

Flashing 22 may be unattached to backer plate 24 and held in place based on its engagement with penetration 12, or may be attached to backer plate 24 such as along the top edge or top portion, which permits at least the bottom portion to fold up as shown in FIG. 9.

Figure 11:
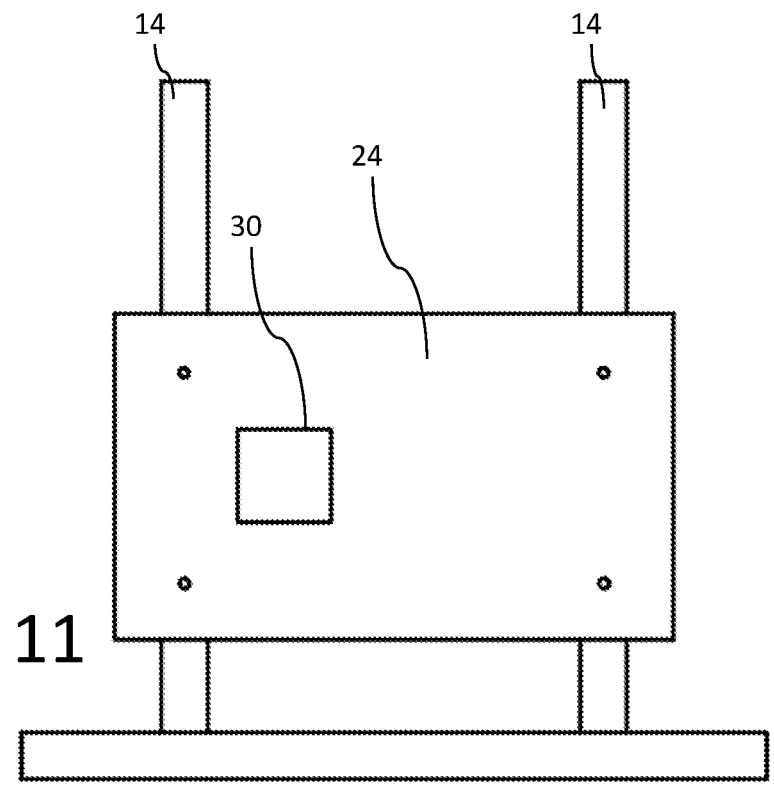
FIG. 11 is a front elevation view of a backer plate with a square opening.
Figure 12:
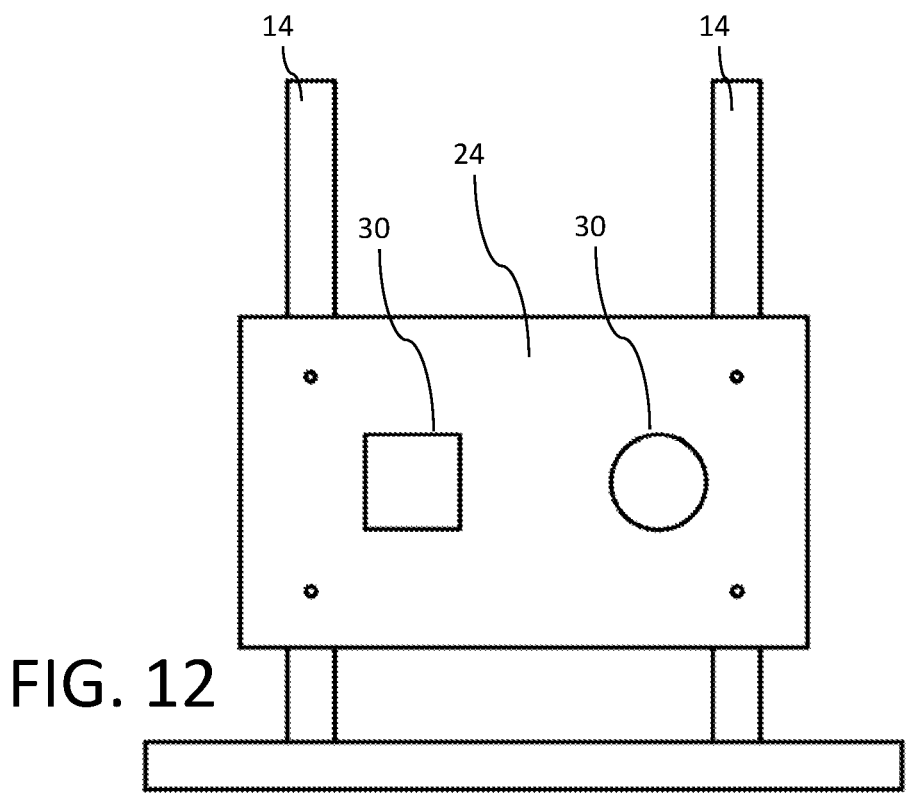
FIG. 12 is a front elevation view of a backer plate with two openings.

Referring to FIG. 11 and FIG. 12, the aperture 30 in backer plate 24 may take a variety of forms to provide suitable access for the utilities 12 to pass therethrough. For example, backer plate 24 may have score lines or frangible connections to either form, enlarge, or shape the aperture as required. The aperture may be circular (such as for conduits, pipes, vents, etc.), rectangular (such as for junction boxes), centralized between studs, offset between studs, etc. Alternatively, there may be more than one aperture 30, or score lines for an aperture 30, in backer plate.

Figure 13:
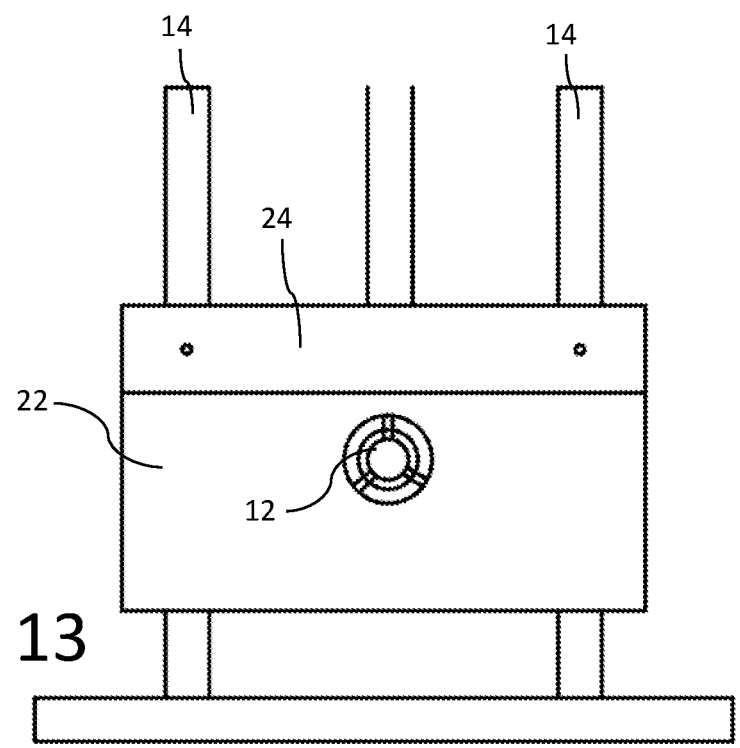
FIG. 13 is a front elevation view of a backer plate that is attached to a top portion of a sheet of flashing material.
Figure 14:
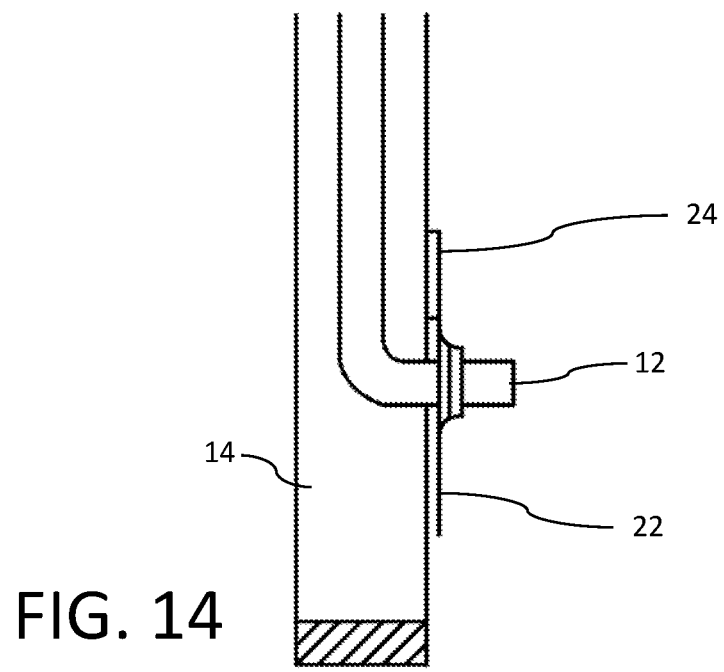
FIG. 14 is a side elevation view of a backer plate that is attached to a top portion of a sheet of flashing material.

Another example of backer plate 24 is shown in FIG. 13 and FIG. 14, in which backer plate 24 is only attached along the top of flashing 22.

Referring to FIG. 15, a slot 28 may be formed in building wrap material 18 that is then placed over the top of flashing 22 with the top inserted through slot 28 to achieve a desired shingled configuration.

Backer plate 24 may be designed to increase the rigidity when installed, such as by folding flaps or folding to form ribs, overlaps, multiple layers, etc. By way of example, referring to FIG. 16 and FIG. 17, backer plate 24 is shown in a configuration that increases its rigidity. Examples are shown from the front and the side, where flaps 34 are folded back against or around stud 14 to increase the rigidity of backer plate 24 and provide additional support to flashing material 22 when installed.

Figure 18:
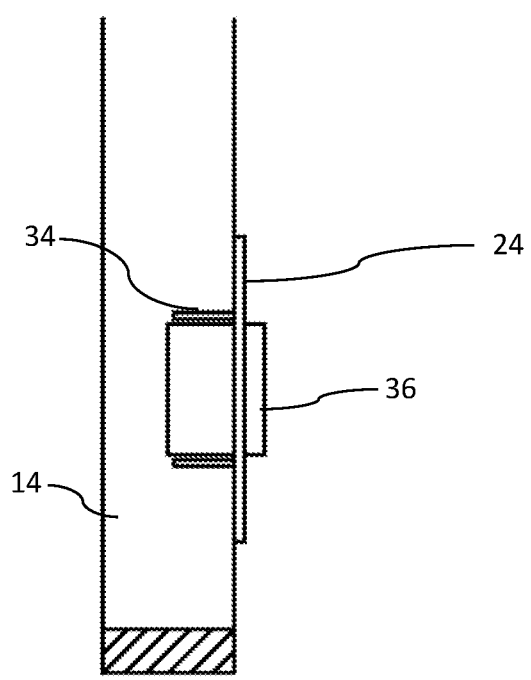
FIG. 18 is a side elevation view of a backer plate that is supported around a junction box.

Referring to FIG. 18, backer 24 is shown with flaps 34 used to support backer 24 around an electrical junction box 36. Flaps 34 may be beneficially used to open backer 24 to be installed around penetration 12, the size of which may be selected or increased based on the size of the opening 30 required. Flaps 34 may also be used to increase the rigidity of backer 24 by providing a crease. Flaps may also be used to engage the support member or stud 14 to which backer 24 is attached to prevent backer 24 from bending backward.

Figure 19:
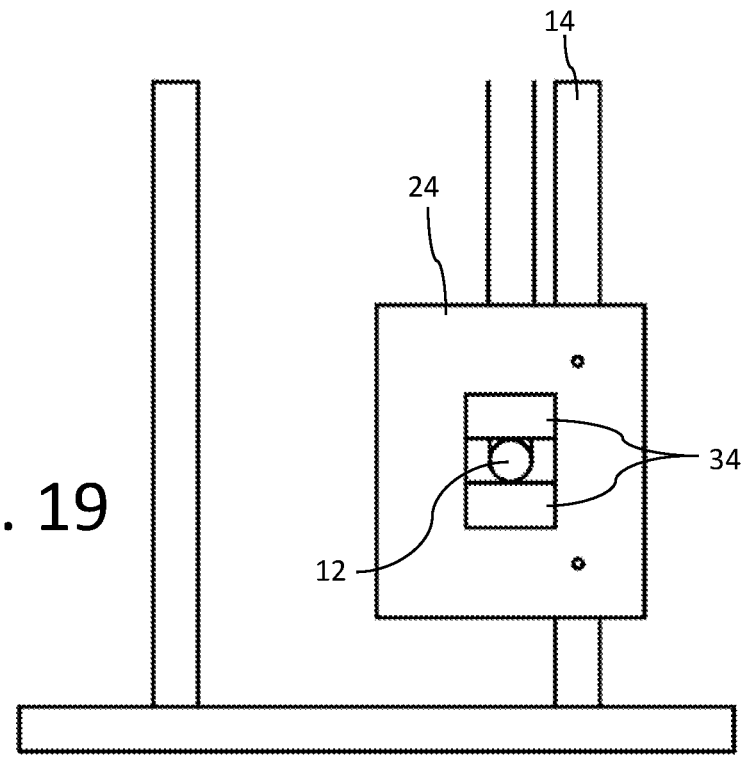
FIG. 19 is a front elevation view of a backer plate with a rectangular opening around a circular penetration.
Figure 20:
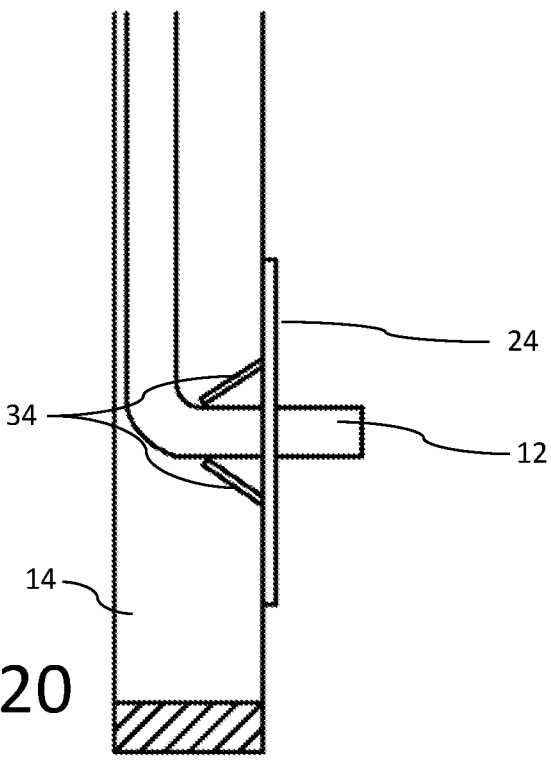
FIG. 20 is a side elevation view of a backer plate with a rectangular opening around a circular penetration.

While opening 30 may be round or square, it may not necessarily match the shape of penetration 12. Instead, backer 24 is used to provide sufficient support to allow the seal to be formed as discussed herein. FIGS. 19 and 20 depict an example of backer board 24 with flaps 34 forming a rectangular opening 30 that receive a circular conduit.

Figure 21:
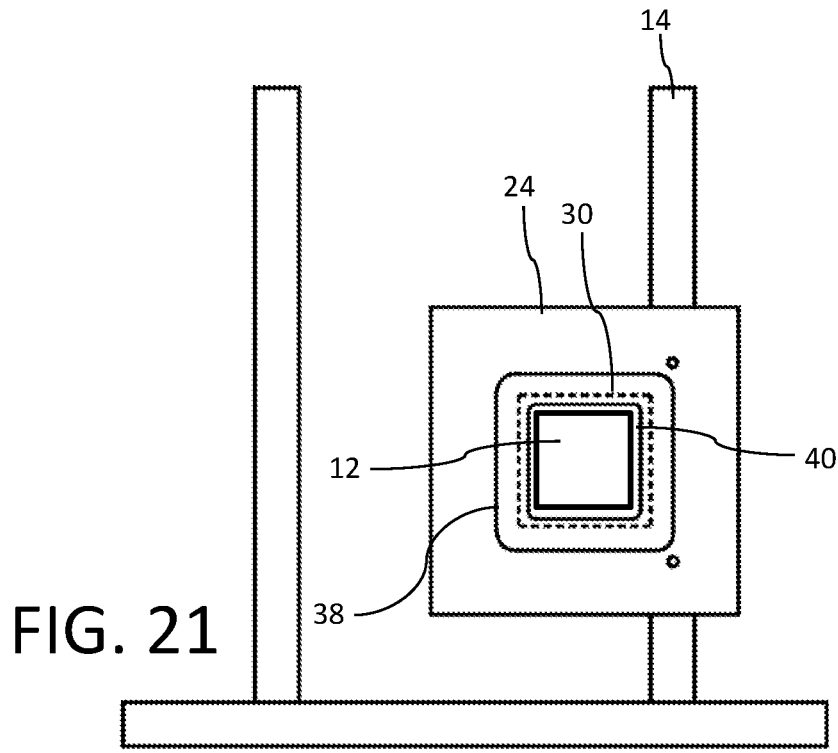
FIG. 21 is a bottom plan view of a support structure with a vapour hat around a penetration.
Figure 22:
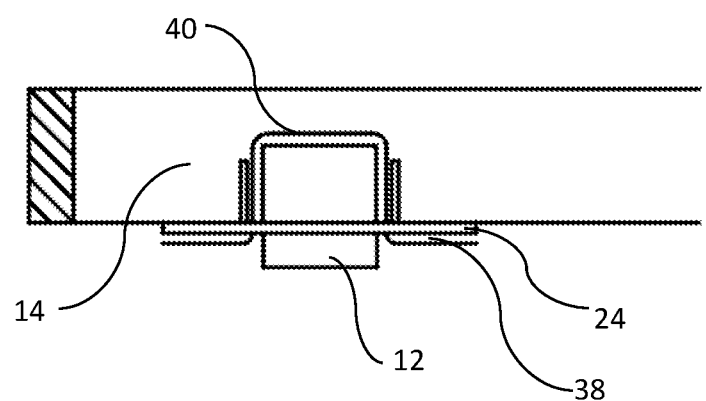
FIG. 22 is a side elevation view of a support structure with a vapour hat.

Referring to FIG. 21 and FIG. 22, the flashing 22 may have a vapour hat 38 that defines a pocket 40 that receives penetration 12, such that vapour hat 38 surrounds penetration 12, and when tied into weather barrier 18, seals against any airflow past penetration 12. Vapour hat 38 may be sealed using tape 26 or other means, such as acoustical sealant, caulking, etc. to tie in vapour hat 38 to the vapour barrier 18. Typically, a vapour hat 38 is useful in penetrations in a ceiling, such as over pot lights, speakers, etc. although vapour hats 38 may also be useful on penetrations in the interior surface of an exterior walls.

Figure 23:
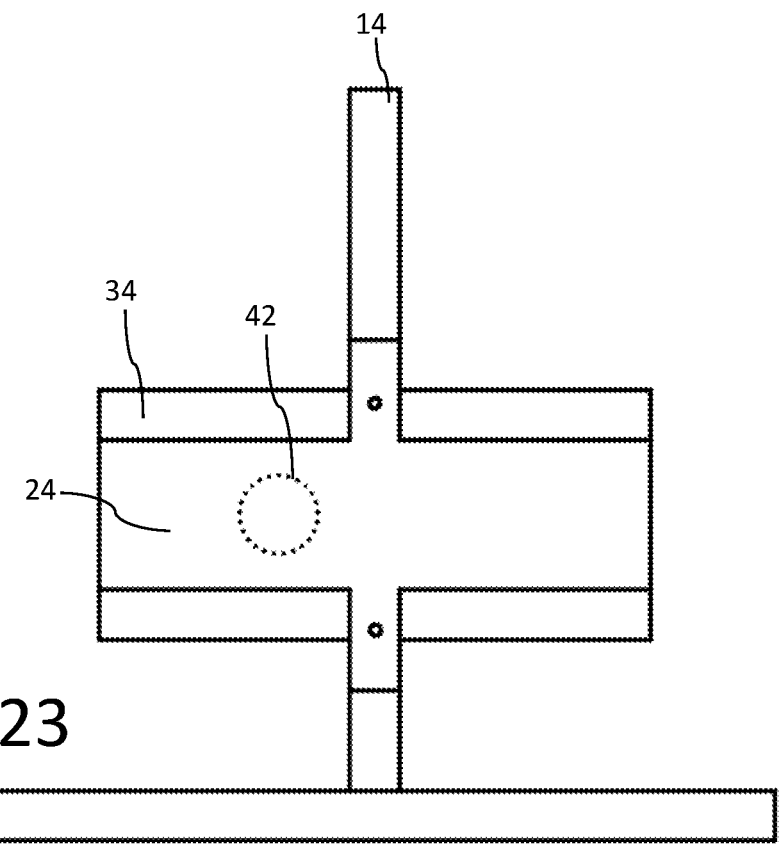
FIG. 23 is a front elevation view of a backer plate that has a punch out and extends on either side of a stud.
Figure 24:
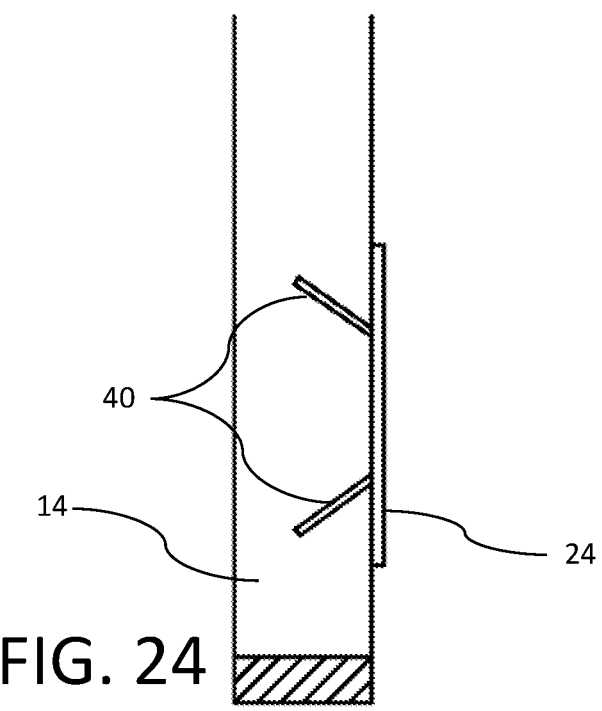
FIG. 24 is a side elevation view of a backer plate that extends on either side of a stud.

Referring to FIG. 23 and FIG. 24, backer 24 may extend on either side of stud 14. Backer 24 may have flaps 34 that are folded back to increase the rigidity of backer 24. Backers 24 may be "blanks", where the installer forms cut-outs during installation, or there may be pre-formed holes or punch-outs 42 formed in backer 24, depending on the installation.

Backer 24 may be designed with a living hinge to facilitate folding of flaps 34, although backer 24 may also have a score line, or be made from multiple parts. While previous examples above are depicted such that only a portion folds down, flaps 34 may be designed to fold across the entire width of backer 24.

Figure 25:
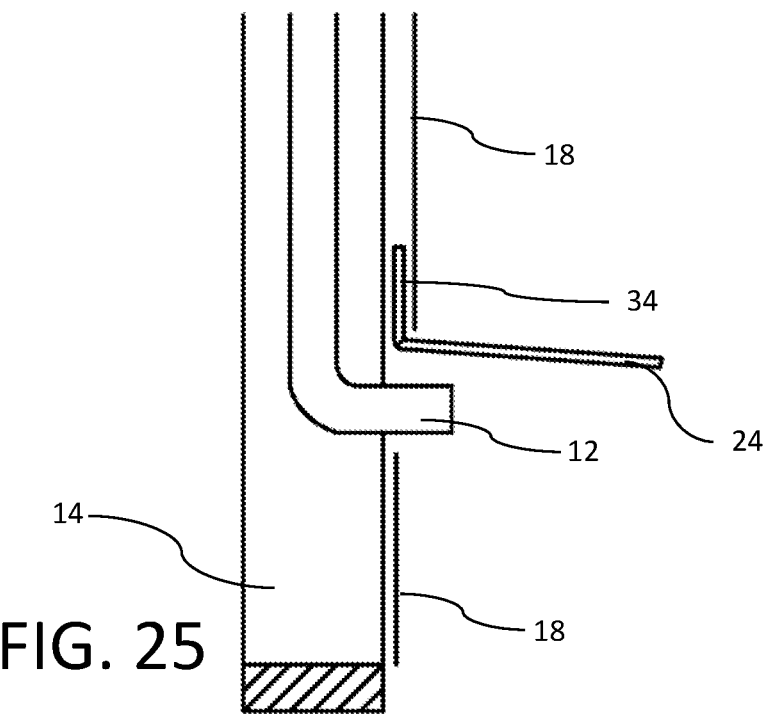
FIG. 25 is a side elevation view of a backer plate with a flap that is inserted under the building wrap.
Figure 26:
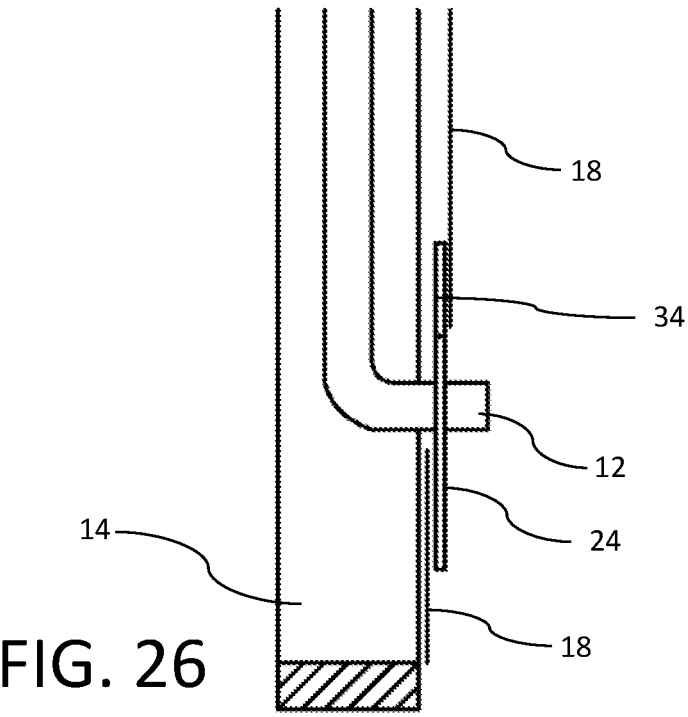
FIG. 26 is a side elevation view of a backer plate having a portion that overlies the building wrap.

The folded portion 34 may be used to increase strength, or may be used to help install backer behind barrier sheet. Referring to FIG. 25 and FIG. 26, flap 34 may be folded down to allow backer 34 to be inserted through slot 28 cut in weather barrier 18 such that a portion is behind weather barrier 18, then backer 24 may be folded down around the penetration 12. A portion of flashing 22 may then be installed in the same manner, although flashing 22 will typically be sufficiently flexible that a living hinge may not be required. This example may be beneficial if backer 24 is to be installed after weather barrier 18, such as if it is determined that additional support is required for a particular connection, a penetration 12 is installed after weather barrier 18, etc.

In some examples, backer 24 may not be required to be a permanent installation as long as it provides sufficient support during installation to achieve the necessary seal between penetration 12 and the building wrap 18, with or without flashing 22 as an intermediate component. As such, the material may not be required to maintain the rigidity once building wrap 18 is installed, or to provide any additional support beyond the amount required to allow the seal to be made. In other examples, backer 24 may be used as a more permanent installation that is used to provide structural support to penetration 12.

The rigidity of backer 24 may be provided by selecting a suitable material, by properly forming the material such as by using corrugated or laminated material or with other ridges, etc., by folding backer 24 such as one or more flaps 34 as discussed above, or by attaching material between more than one anchor point, such as between adjacent studs 14.

The material in the depicted examples may be cardboard, plastic, or metal, and may be corrugated or a single sheet of material, or other materials that are sufficiently rigid, or may be made sufficiently rigid when installed, to at least provide sufficient support to allow the seal to be made, as discussed above.

The sheet of material 22 being supported by backer 24 may be flexible or sufficiently flexible that backer is useful to act as a support behind weather barrier 18 to facilitate the installation of adhesive tape 26. For example, sheet of material 22 and/or additional sheet of material may be sufficiently flexible that, upon application of a force to apply adhesive tape 26, the materials would otherwise move, and backer 24 provides a sufficiently rigid support to hold the materials in place as adhesive tape 26 is applied. Once installed, backer 24 is generally not required to provide any additional function, although it may be useful for doing so.

In another example, the material of backer 24 may be a strip of material to which the flashing is attached, such as by stapling, gluing, weaving through slots, etc. to attach them together, if the backer material is insufficiently rigid to support flashing on its own.

Figure 27:
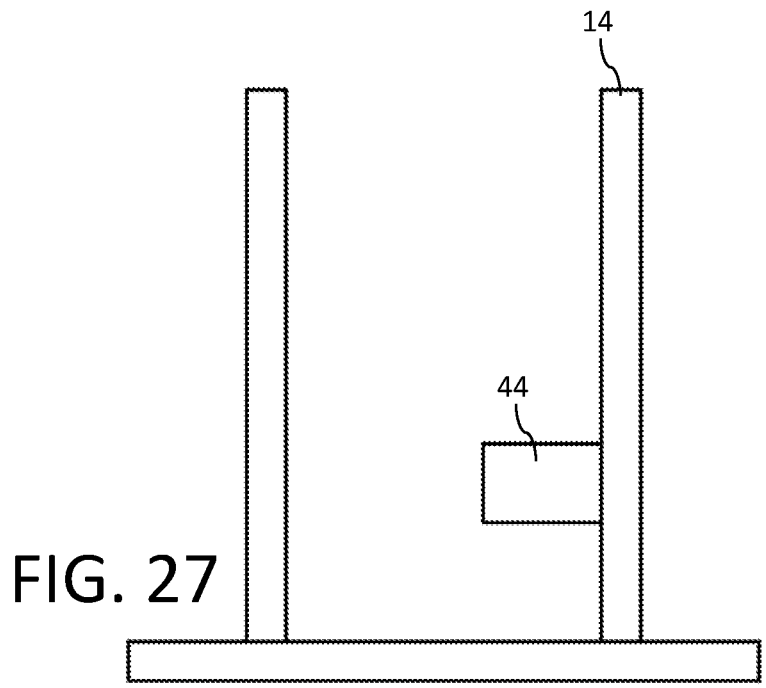
FIG. 27 is a front elevation view of a support member.
Figure 28:
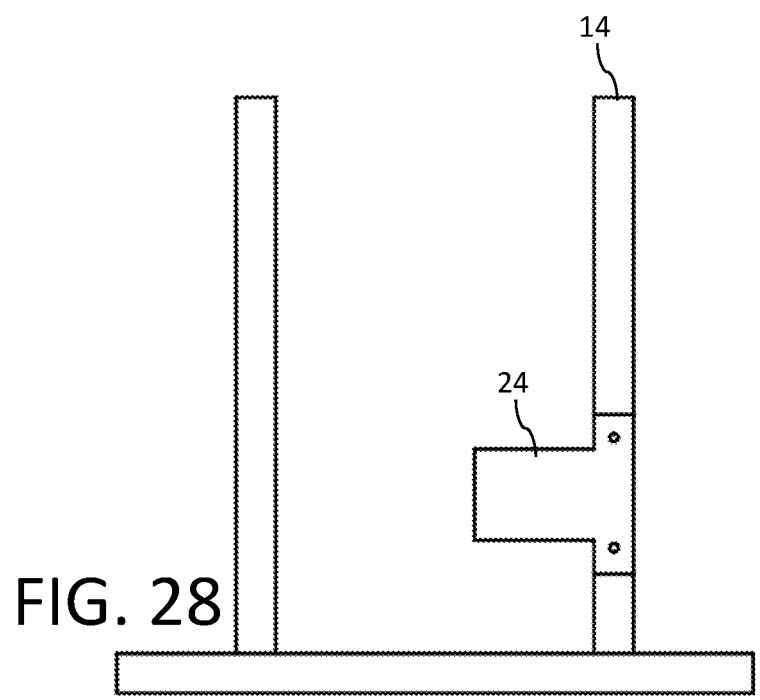
FIG. 28 is a front elevation view of a backer plate installed on the support member of FIG. 27.
Figure 29:
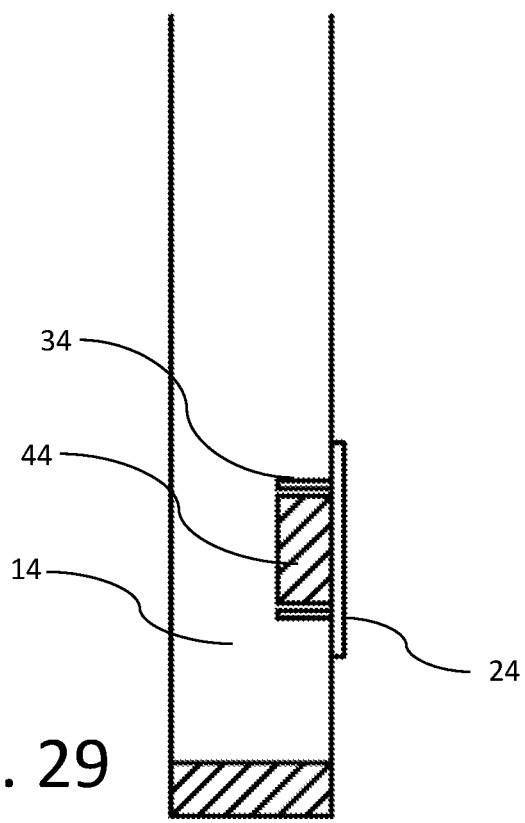
FIG. 29 is a side elevation view of a backer plate installed on the support member of FIG. 27.

In another example, backer 24 may be a composite structure that may involve an additional support member. Referring to FIG. 27 through FIG. 29, backer 24 may be made from cardboard is attached to stud 14 at one end, and to a stud length of wood 44 at the other. Backer may have flaps 34 that are folded around the stud 44 to provide additional rigidity to backer 24. In the depicted example, penetration 12 is mounted to the stud 44, a holder (not shown) may be installed against a stud 14 and holds length of stud 44 behind weather barrier 18. Any suitable structural member of any suitable size may be used in place of stud 44, and penetration 12 may or may not be attached thereto. If backer 24 is strong enough, the stud 44 and penetration 12 may be carried by backer 24. Alternatively, backer 24 may be mounted solely to penetration 12 support member if it is sufficiently rigid.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:
1. A method of sealing around a penetration that extends out of a wall of a building, the wall comprising structural members separated by spaces and the penetration being positioned in one of the spaces, the method comprising the steps of:

installing a weather barrier across the spaces between the structural members of the wall, the weather barrier being attached directly to the structural members and closing the spaces, the weather barrier defining an inner surface that faces the spaces and a wall surface opposite the inner surface and such that the penetration extends through the weather barrier and past the wall surface, the weather barrier comprising a flexible sheet of material;

installing a backer support adjacent to the inner surface of the weather barrier and opposite the wall surface and adjacent to the penetration, the backer support extending at least partially across a width of the one of the spaces that corresponds to the penetration and only a portion of a height of the one of the spaces; and sealing the penetration to the weather barrier by applying a sealing material around the penetration, the sealing material sealing directly between the penetration and the weather barrier, the backer support being sufficiently rigid to support the weather barrier and the sealing material against pressure applied during installation.

2. The method of claim 1, wherein the weather barrier comprises a vapour barrier and the structural members comprise joists of a ceiling.

3. The method of claim 1, wherein the sealing material comprises a sheet of flashing material surrounding the penetration, the sheet of flashing material being installed such that an upper portion is between the backer support and the weather barrier, and a lower portion overlies the weather barrier and the backer.

4. The method of claim 1, wherein the sealing material comprises caulking, acoustical sealant, adhesive tape, a sheet of flashing material, a sheet of flashing material, or combinations thereof.

5. The method of claim 1, wherein the backer support comprises folding flaps that fold away from the wall surface to increase the rigidity of the backer.

6. The method of claim 1, wherein the backer support is only attached to a single one of the structural members.

7. The method of claim 1, wherein the backer support is attached between adjacent ones of the structural members to increase the rigidity of the backer support.

8. The method of claim 1, wherein the backer support is mounted to the penetration.

9. The method of claim 1, wherein the backer support surrounds the penetration.

10. The method of claim 1, wherein the structural members are studs, trusses, beams, joists, or a utility support member.

11. The method of claim 2, wherein the sealing material comprises a vapour barrier hat that surrounds a penetration installed in the ceiling.

12. A building wall having structural members separated by spaces and a penetration positioned in one of the spaces that extends out of the building wall, the building wall comprising:
a weather barrier installed across the spaces between the structural members such that the weather barrier defines an inner surface that faces the spaces and a wall surface opposite the inner surface and such that the penetration extends through the weather barrier and past the wall surface, the weather barrier comprising a flexible sheet of material;
a backer support installed behind the weather barrier and adjacent to the penetration;
a sealing material that seals between the penetration and the weather barrier, the backer support comprising one or more folding flaps that fold away from the wall surface and along a folding axis that extends between adjacent structural members of the structural members to increase the rigidity of the backer support, the backer support having sufficient rigidity to support pressure applied to the sealing material and the flexible sheet of material during installation of the sealing material.

13. The building wall of claim 12, wherein the weather barrier is attached directly to the structural members and closes the spaces when installed.

14. The building wall of claim 12, wherein the sealing material comprises a sheet of flashing material surrounding the penetration, the sheet of flashing material comprising an upper portion positioned between the backer support and the weather barrier, and a lower portion overlying the weather barrier and the backer support.

15. The building wall of claim 12, wherein the backer support surrounds the penetration.

16. The building wall of claim 12, wherein the backer support is only attached to a single one of the structural members.

17. The building wall of claim 12, wherein the backer support is attached between adjacent ones of the structural members to increase the rigidity of the backer support.

18. The building wall of claim 12, wherein the backer support is mounted to the penetration.

19. The building wall of claim 12, wherein the structural members are studs, trusses, beams, joists, or a utility support member.

20. The building wall of claim 12, wherein the weather barrier comprises a vapour barrier and the structural members comprise joists of a ceiling.

21. The building wall of claim 20, wherein the sealing material comprises a vapour barrier hat that surrounds a penetration installed in the ceiling.

22. A building wall having structural members separated by spaces and a penetration positioned in one of the spaces that extends out of the building wall, the building wall comprising:
a weather barrier installed across the spaces between the structural members such that the weather barrier defines an inner surface that faces the spaces and a wall surface and such that the penetration extends through the weather barrier and past the wall surface, the weather barrier comprising a flexible sheet of material;
a backer support adjacent to the inner surface of the weather barrier and opposite the wall surface and adjacent to the penetration;
a sealing material that seals between the penetration and the weather barrier, the sealing material comprising a sheet of flashing material that surrounds the penetration, the sheet of flashing material comprising an upper portion positioned between the backer support and the weather barrier, and a lower portion overlying the weather barrier and the backer support, the backer support having sufficient rigidity to support pressure applied to the sealing material and the flexible sheet of material during installation of the sealing material.

23. The building wall of claim 22, wherein the sealing material further comprises caulking, acoustical sealant, adhesive tape, or combinations thereof.

* * * * *